United States Patent [19]

Abraham et al.

[11] Patent Number: 5,219,679
[45] Date of Patent: Jun. 15, 1993

[54] SOLID ELECTROLYTES

[75] Inventors: Kuzhikalail M. Abraham, Needham; Mohamed Alamgir, Dedham, both of Mass.

[73] Assignee: EIC Laboratories, Inc., Norwood, Mass.

[21] Appl. No.: 642,605

[22] Filed: Jan. 17, 1991

[51] Int. Cl.$^5$ .............................................. H01M 6/18
[52] U.S. Cl. ..................................... 429/192; 429/194
[58] Field of Search ................................ 429/192, 194

[56] References Cited

U.S. PATENT DOCUMENTS

| | | | |
|---|---|---|---|
| 4,303,748 | 12/1981 | Armand et al. | 429/192 |
| 4,495,258 | 1/1985 | Le Méhauté et al. | 429/194 |
| 4,517,265 | 5/1985 | Belanger et al. | 429/217 |
| 4,654,279 | 3/1987 | Bauer et al. | 429/192 |
| 4,830,939 | 5/1989 | Lee et al. | 429/192 |
| 4,865,932 | 9/1989 | Masuda et al. | 429/213 |
| 4,908,283 | 3/1990 | Takahashi et al. | 429/192 |

FOREIGN PATENT DOCUMENTS 0279554  6/1988  European Pat. Off. .

OTHER PUBLICATIONS

Blonsky and Shriver, "Polyphosphazene Solid Electrolytes," J. Am. Chem. Soc., 106, 6854–6855 (1984).
Pantaloni et al., "Electrochemical Characterization of a Class of Low Temperature Conducting Polymer Electrolytes," Electrochim. Acta, 34, 635–640 (1989).
Watanabe et al., "Ionic Conductivity of Hybrid Films Composed of Polyacrylonitrile, Ethylene Carbonate, and LiClO$_4$," J. Polymer Science, 21, 939–948 (1983).
Munshi and Owens, "Performance of Polymer Electrolyte Cells at +25° to +100° C.," Solid State Ionics, 26, 41–46 (1988).

Primary Examiner—Asok Pal
Assistant Examiner—C. Everhart

[57] ABSTRACT

This invention pertains to Li ion (Li$^+$) conductive solid polymer electrolytes composed of solvates of Li salts immobilized (encapsulated) in a solid organic polymer matrix. In particular, this invention relates to solid polymer electrolytes derived by immobilizing complexes (solvates) formed between a Li salt such as LiAsF$_6$, LiCF$_3$SO$_3$ or LiClO$_4$ and a mixture of aprotic organic solvents having high dielectric constants such as ethylene carbonate (EC) (dielectric constant=89.6) and propylene carbonate (PC) (dielectric constant=64.4) in a polymer matrix such as polyacrylonitrile, poly(tetraethylene glycol diacrylate), or poly(vinyl pyrrolidinone).

8 Claims, 3 Drawing Sheets

SOLID ELECTROLYTES

This invention was made with Government support under Contract DE-AC01-89ER80813 awarded by the United States Department of Energy. The Government has certain rights in this invention.

FIELD OF INVENTION

Background of the Invention

Alkali metal ion conductive polymer electrolytes are of interest for use in high energy density batteries, sensors and electrochromic devices. Conventional polymer electrolytes are complexes of Li salts with organic polymers having an electron donor atom such as O or N. The most prominent conventional polymer electrolytes are the complexes of alkali metal salts, particularly Li salts, with poly(ethylene oxide), (PEO). These complexes have the formula $EO \cdot (LiX)_n$ where EO stands for an ethylene oxide unit in PEO and LiX is a Li salt such as $LiClO_4$, $LiCF_3SO_3$, $LiBF_4$, $LiAsF_6$ etc. and n typically has a value of 0.125. PEO-based electrolytes have very low conductivities of the order of $10^{-8}$ $ohm^{-1} \cdot cm^{-1}$ at room temperature with the result that they are not practical for normal temperature applications. Therefore, rechargeable Li batteries utilizing PEO-based electrolytes are operated at about 100° C. where the electrolytes attain a practical conductivity of about $10^{-3}$ $ohm^{-1} \cdot cm^{-1}$. Conductivities of this magnitude are exhibited at room temperature by nonaqueous liquid electrolytes and are required for the fabrication of electrochemical devices suitable for moderate to high rate applications.

The prevailing theory of ionic conduction in polymer electrolytes teaches that ionic conductivity is facilitated by the large-scale segmental motion of the polymer backbone and that ionic conductivity principally occurs in the amorphous regions of the polymer electrolyte. Crystallinity restricts polymer backbone segmental motion and significantly reduces conductivity. Consequently, polymer electrolytes with high conductivity at room temperature have been sought through polymers which have highly flexible backbones and have largely amorphous morphology. Li salt complexes of polymers such as poly[bis-(methoxyethoxyethoxy)phosphazene (reported by Blonsky et al., J. Am. Chem. Soc., 106, 6854 (1984) and poly(ethoxy-ethoxy-ethoxy-vinyl ether) (described by Pantaloni et al., Electrochim. Acta, 34, 635 (1989), prepared on the basis of these principles, have shown room temperature conductivities of around $10^{-5}$ $ohm^{-1} \cdot cm^{-1}$.

We discovered that polymer electrolytes having conductivities greater than $10^{-3}$ $ohm^{-1} \cdot cm^{-1}$ at room temperature can be obtained by immobilizing or encapsulating complexes (solvates) formed between a low lattice energy Li salt such as $LiClO_4$, $LiBF_4$, $LiAsF_6$ or $LiCF_3SO_3$ and a high dielectric constant aprotic organic solvent mixture of propylene carbonate and ethylene carbonate in a polymer matrix such as polyacrylonitrile. In this manner, ionic conductivity characteristic of liquid media can be attained in a solid polymer electrolyte structure. (Here, a dielectric constant of 20 or more in solvents is considered high and those below twenty are considered low). This non-conventional approach of preparing highly conductive solid polymer electrolytes has been successfully demonstrated with the development of several electrolytes with conductivities in the range from $1.2 \times 10^{-3}$ to $4 \times 10^{-3}$ $ohm^{-1} \cdot cm^{-1}$ at room temperature. This invention is the subject of this patent application.

SUMMARY OF THE INVENTION

An object of this invention is to provide new solid polymeric electrolytes.

A further object of this invention is to provide solid polymeric electrolytes which have conductivities characteristic of non-aqueous liquid electrolytes of greater than $10^{-3}$ $ohm^{-1} \cdot cm^{-1}$ at room temperature. These and other objects of this invention are accomplished by providing solid polymer electrolytes composed of Li salt or other alkali or alkaline earth metal salt solvates of organic solvents, having high dielectric constants, immobilized in a polymer of polyacrylonitrile (PAN), poly(tetraethylene glycol diacrylate) (PEGDA), poly(-vinyl pyrrolidinone) (PVP), or similar polymers.

A typical solid electrolyte comprises 70 mole-percent (m/o) of a binary aprotic organic solvent mixture consisting of ethylene carbonate (EC) and propylene carbonate (PC) containing 10 m/o $LiClO_4$ immobilized in 20 m/o PAN. It has conductivities of $1.7 \times 10^{-3}$ $ohm^{-1} \cdot cm^{-1}$ at 20° C. and $1.1 \times 10^{-3}$ $ohm^{-1} \cdot cm^{-1}$ at $-10°$ C. Five different solid electrolyte films we have prepared and their conductivities are listed in Table 1.

TABLE 1

| | CONDUCTIVITIES OF SOLID POLYMER ELECTROLYTES | | | | |
|---|---|---|---|---|---|
| Electrolytes | | Conductivity $(ohm^{-1} \cdot cm^{-1})$[1] | | | |
| No. | Composition | $-10°$ C. | 0° C. | 20° C. | 50° C. |
| 1. | 70%[2] EC & PC/20% PAN/ 10% $LiClO_4$ | $1.1 \times 10^{-3}$ | $1.2 \times 10^{-3}$ | $1.7 \times 10^{-3}$ | $3.5 \times 10^{-3}$ |
| 2. | 78 EC & PC/15 PAN/ 7 $LiCF_3SO_3$ | $4.0 \times 10^{-4}$ | $6.0 \times 10^{-4}$ | $1.4 \times 10^{-3}$ | $2.2 \times 10^{-3}$ |
| 3. | 57 EC/12 PC/15 PAN/ 1 PEGDA/15 $LiClO_4$ | $4.0 \times 10^{-4}$ | $6.0 \times 10^{-4}$ | $1.2 \times 10^{-3}$ | $3.0 \times 10^{-3}$ |
| 4. | 68 EC/15 PC/3 PEGDA/ 14 $LiClO_4$ | $1.2 \times 10^{-3}$ | $2.1 \times 10^{-3}$ | $4.0 \times 10^{-3}$ | $8.0 \times 10^{-3}$ |
| 5. | 35 EC/30 PC/ 24 PVP/11 $LiCF_3SO_3$ | $4.0 \times 10^{-5}$ | $1.3 \times 10^{-4}$ | $5.0 \times 10^{-4}$ | $1.0 \times 10^{-3}$ |

[1] All conductivities were measured by the complex impedance technique.
[2] All are mole percentages, with mole percentages of polymers based on molecular weight of their respective monomers.

DETAILED DESCRIPTION OF THE INVENTION

Figure 1:
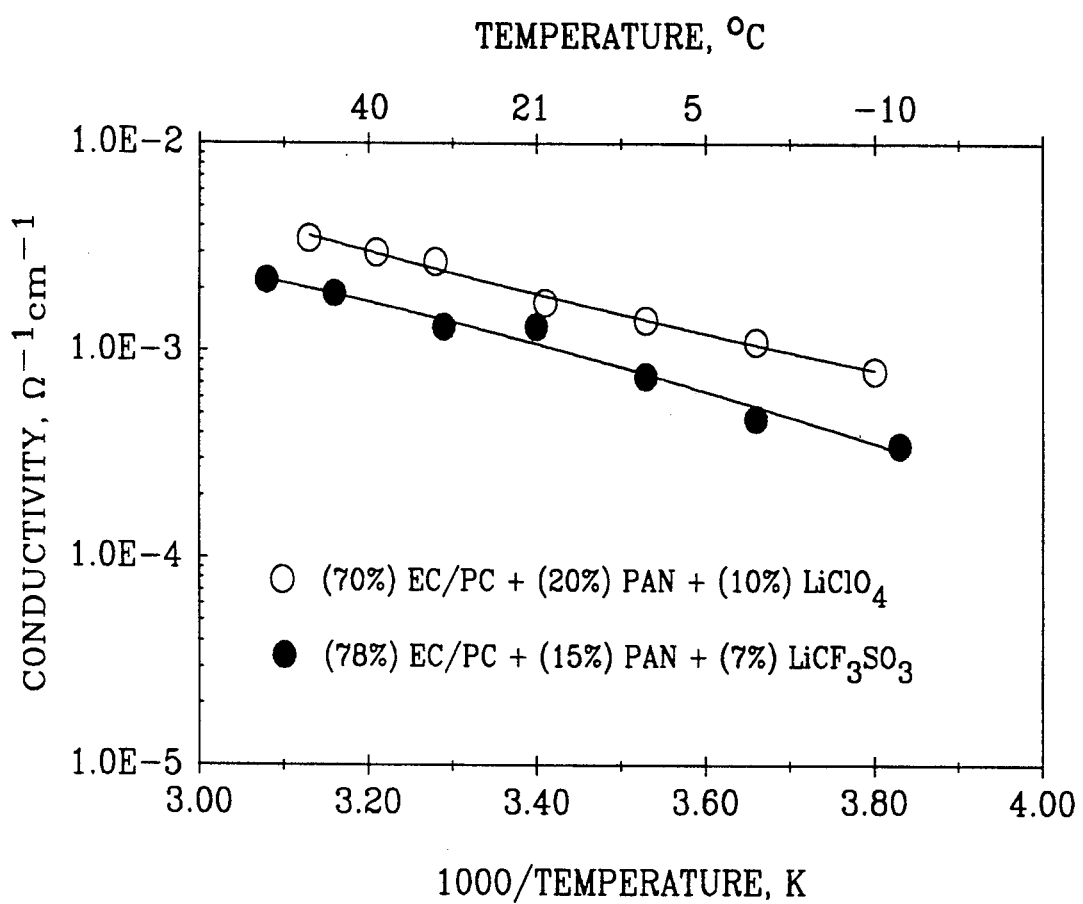
FIG. 1 depicts the conductivities of two electrolyte films prepared using polyacrylonitrile (PAN) as the polymer matrix. The conductivities are presented for a series of temperatures between $-10°$ C. and 50° C. The mole percentage of each electrolyte component is given in the legend to the curves.

Solid polymer electrolytes which conduct alkali metal ions such as $Li^+$ and $Na^+$ are of importance for the fabrication of solid-state devices such as primary and secondary Li batteries and electrochromic windows. The rate at which these solid-state devices can be operated, i.e., the speed with which the energy from a Li battery can be drained, or the speed at which the color of an electrochromic window can be switched, depends, to a large extent, on the conductivity of the polymer electrolyte. A goal of researchers in the field has been $Li^+$-conductive solid polymer electrolytes exhibiting conductivities of the order of $10^{-3}$ $ohm^{-1}.cm^{-1}$ at $20°$ C. (i.e., room temperature), a value typical of many liquid electrolytes. With such high conductivity in solid polymer electrolytes, solid-state Li batteries and electrochromic devices with rate capabilities characteristic of their liquid electrolyte counterparts can become feasible. In prior research, organic liquids have been added to polymer electrolytes such as $(EO)_n$—LiX to raise their conductivities. Thus, Munshi and Owens have reported increasing the conductivity of $(EO)_n$—LiX by adding a small amount of propylene carbonate into the polymer electrolyte during the course of fabrication of a Li cell (M. Z. A. Munshi and B. B. Owens, Solid-State Ionics, 26, 41 (1988). There is no indication in this work of preparing dimensionally stable free-standing electrolyte films. North (EP 0279554) added a mixture of ethylene carbonate and propylene carbonate to $(EO)_n.LiClO_4$ complex to increase the conductivity of the latter electrolyte. A disadvantage of this modification as stated in this patent (line 55-57, column 3) is "the resulting film is, however, sticky and therefore less easy to handle than prior art electrolytes". This is an expected result since PEO is soluble in EC and PC. It is, therefore, apparent that the preparation of free-standing, solid polymer electrolytes remained an elusive goal to these authors. Watanabe et al. prepared solid polymer electrolytes with a conductivity of $2 \times 10^{-4}$ $ohm^{-1}.cm^{-1}$ at room temperature from a solution of $LiClO_4$ in ethylene carbonate immobilized in polyacrylonitrile (M. Watanabe et al., J. Polymer Sci., Polym. Phys., 21, 939 (1983). They did not foresee that an order of magnitude higher conductivity can be obtained from a mixed aprotic organic solvent solvate of a Li salt immobilized in a polymer matrix.

In our investigations, we have discovered, surprisingly, that dimensionally stable, free-standing solid polymer electrolyte films with conductivities of greater than $10^{-3}$ $ohm^{-1}.cm^{-1}$ at room temperature can be obtained by immobilizing or encapsulating in a polymer matrix solvates formed between a Li salt such as $LiClO_4$ or $LiCF_3SO_3$ and a 1:1 by volume mixture of ethylene carbonate (EC) and propylene carbonate (PC). This unexpected result achieved with an EC/PC mixture as opposed to EC or PC alone is exemplified by the data in Table 2 which shows that while the solid polymer electrolyte based on the solvate formed between $LiClO_4$ and, either propylene carbonate or ethylene carbonate alone has a conductivity at $20°$ C. of only $8.4 \times 10^{-4}$ $ohm^{-1}.cm^{-1}$ and $2.14 \times 10^{-4}$ $ohm^{-1}.cm^{-1}$, respectively, the one based on a mixture of ethylene carbonate and propylene carbonate at the same temperature has a conductivity of $1.7 \times 10^{-3}$ $ohm^{-1}.cm^{-1}$.

TABLE 2

CONDUCTIVITIES OF SOLID-POLYMER ELECTROLYTES

| Electrolytes Composition | Conductivity $(ohm^{-1} \cdot cm^{-1})$[1] | | |
|---|---|---|---|
| | $0°$ C. | $20°$ C. | $50°$ C. |
| 68% PC/16% PAN/16% $LiClO_4$ | $2.1 \times 10^{-4}$ | $8.4 \times 10^{-4}$ | $1.8 \times 10^{-3}$ |
| 70% EC & PC/20% PAN/ 10% $LiClO_4$ | $1.2 \times 10^{-3}$ | $1.7 \times 10^{-3}$ | $3.5 \times 10^{-3}$ |
| 37% EC/51% PAN/12% $LiClO_4$ | — | $2.14 \times 10^{-4}$ | — |

Li salts and solvents suitable for preparing the electrolytes of this invention are preferably selected on the basis of the same principles used for selecting these components for highly conductive liquid electrolytes. These requirements include: 1) Li salts having large anions such as $ClO_4^-$, $AsF_6^-$, $BF_4^-$ and $CF_3SO_3^-$, $PF_6^-$ with low lattice energies; 2) organic solvents with high dielectric constants to promote the dissociation of the low lattice energy Li salts, thereby forming highly conductive electrolytic medium; 3) organic solvents having electron donor atoms such as O and N through which the solvents can form complexes (or solvates) with the Li ions of the Li salt. These requirements are realized with Li salts such as $LiBF_4,LiClO_4$ exhibiting lattice energies of 699 and 723 kilo-joules (kj)/mole, respectively, and organic solvents such as PC and EC with dielectric constants of 64.4 and 89.6, respectively. The lattice energies of other salts such as $LiAsF_6, LiCF_3SO_3, LiPF_6$ have not been reported in the literature, but by comparing the conductivities of liquid electrolytes formed from these with those of liquid electrolytes containing $LiClO_4$ or $LiBF_4$, it can be concluded that the former three salts have lattice energies of the same order as the latter two. In contrast, Li salts formed from simple anions such as $Cl^-$ or $F^-$ have much higher lattice energies, i.e., 841 kj/mole for LiCl and 1025 kj/mole for LiF, and they either do not dissolve, or form only very poorly conducting solutions, in organic solvents.

In addition to ethylene carbonate and propylene carbonate, high dielectric solvents preferred for preparing solid polymer electrolytes of the present invention are listed in Table 3. Preferably, the high dielectric constant of a solvent is complemented by high boiling point in order to obtain electrolyte films with good dimensional stability. Dimensional stability is defined as the ability of the electrolyte to be isolated as free-standing films. Ideally, a mixture of two or more of these solvents are used for preparing an electrolyte having a conductivity of greater than $10^{-3}$ $ohm^{-1}.cm^{-1}$ at room temperature.

TABLE 3
SUITABLE SOLVENTS FOR PREPARING SOLID POLYMER ELECTROLYTES

| Solvent | Dielectric Constant | Boiling Point (°C.) |
| --- | --- | --- |
| Ethylene Carbonate | 89.6 | 248 |
| Propylene Carbonate | 64.4 | 241 |
| Dimethyl Sulfoxide | 46.5 | 189 |
| Tetramethylene Sulfone (sulfolane) | 43.3 | 287 |
| γ-butyrolactone | 39.1 | 202 |
| N-methyl Pyrrolidinone | 32 | 204 |

Figure 2:
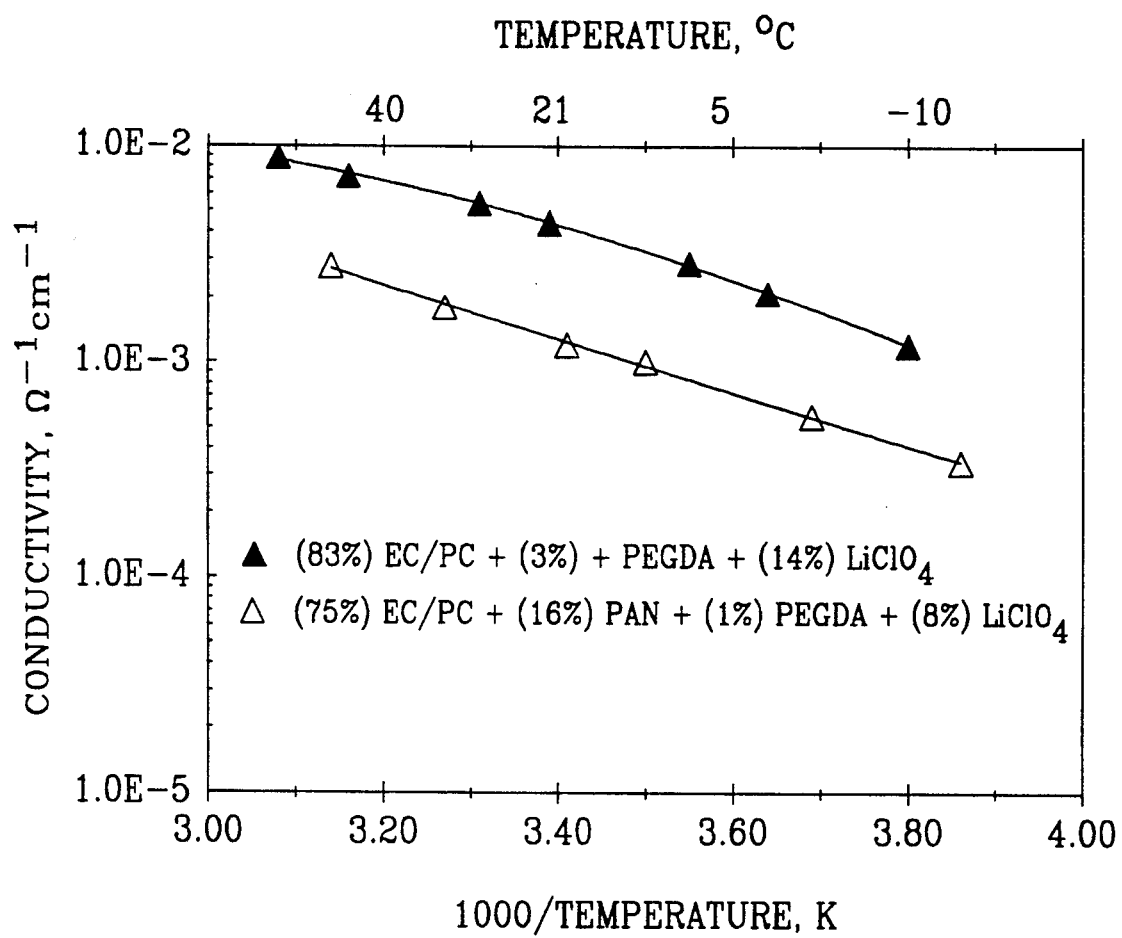
FIG. 2 depicts the conductivities of two electrolyte films prepared using poly(tetraethylene glycol diacrylate) (PEGDA), and a mixture of poly(tetraethylene glycol diacrylate) and polyacrylonitrile (PAN), respectively, as the polymer matrices. The conductivities are presented for a series of temperatures between $-10°$ C. and $50°$ C. The mole percentage at each electrolyte component is given in the legend to the curves.

The nature of the polymer suitable for use as a matrix for immobilizing or encapsulating the ionically conducting Li salt solvate phase is of less importance. This is evident in the data in FIGS. 1 and 2 and Table 1. Polymers suitable for this purpose include polyacrylonitrile, (PAN), poly(tetraethylene glycol diacrylate), (PEGDA), and poly(vinyl pyrrolidinone), (PVP). A desirable feature of the polymer is that it contains electron donor atoms such as O and N through which they can complex with $Li^+$. They should also be insoluble in highly polar organic solvents such as those listed in Table 3.

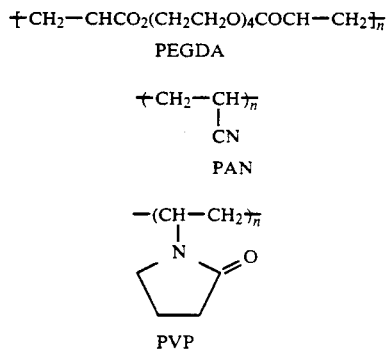

Other polymers suitable for use as a matrix include poly(vinyledene difluoride), $-(-CH_2-CF_2-)_n-$, poly(vinyl acetate) $-[-(CH_3COO)CH-CH_2-]_n-$, polyvinyl sulfone, $[-(-CH_2-CH-)_2-SO_2-]_n-$ and others of similar structure.

The general methods of preparation of these solid polymer electrolytes can be illustrated with respect to the electrolytes (Nos. 1-5) listed in Table 1. Electrolytes Nos. 1 and 2 were prepared by dissolving PAN in an appropriate amount of $EC/PC-LiClO_4$ solution at 120° C. and evaporating off the excess solvents in vacuum until a film is formed. Alternatively, electrolyte No. 3 could be prepared by adding PAN and tetraethylene glycol diacrylate (TEGDA) in the appropriate proportion to an $EC/PC-LiClO_4$ solution and UV-irradiating the solution to allow cross linking of TEGDA. Electrolytes No. 4 and 5 based in PEGDA and PVP, respectively, were also prepared by the UV-irradiation technique.

The amount of Li salt, solvent mixture and polymer matrix in the polymer electrolyte is not critical. They are taken in amounts sufficient to yield the highest conductivity in a dimensionally stable, free-standing film of the electrolyte.

For a high energy density ambient temperature battery embodying this invention, the negative electrode material preferably consists of lithium of as high purity as possible. Nevertheless, for certain other battery applications it may consist of a lithium alloy or amalgam. If a lithium alloy is used, it preferably is a lithium-tin, lithium-lead, lithium-gold, lithium-platinum, lithium-cadmium, lithium-mercury, lithium-zinc, lithium-silver, lithium-aluminum or lithium-magnesium alloy having at least 50%, more preferably at least 65% lithium by weight.

Also, electrolytes made in accordance with this invention may be used in cells where the anode essentially includes or is a material other than lithium, e.g., potassium, sodium, magnesium, calcium or zinc, or a mixture thereof with or without lithium. Furthermore, while the invention is most advantageous in providing high energy density primary, and secondary cells, the electrolyte may be formulated so as to provide stable low or medium energy density cells.

For a high energy density ambient temperature battery, the positive electrode material preferably consists of titanium disulfide ($TiS_2$). Preferably this positive electrode material is made in accordance with the teachings of U.S. Pat. No. 4,007,055, issued Feb. 8, 1977 to M. Stanley Whittingham. However, for other less stringent battery applications the positive electrode material may comprise other transition metal compounds and notably other insoluble chalcogenides of titanium, zirconium, hafnium, vanadium, niobium, tantalum, molybdenum, tungsten, rhenium, platinum, germanium, iron, tin and lead, e.g., $TiS_3$, $TiSe_2$, $TiSe_3$, $ZrS_2$, $ZrS_3$, $HfS_2$, $HfS_3$, $VS_2$, $VS_3$, $NbS_2$, $NbS_3$, $TaS_2$, $TaS_3$, $SrSe_2$, $ZrSe_3$, $HfSe_2$, $HfSe_3$, $VSe_2$, $VSe_3$, $NbSe_2$, $NbSe_3$, $TaSe_2$, $TaSe_3$, and alloys of the foregoing cations such as $ZrHfSe_2$. Other positive electrode materials may comprise mixed sulfides such as $Fe_xV_{1-x}S_2$ and $Cr_xV_{1-x}S_2$ ($x=<1$) and sulfide compounds such as $NiPS_3$ and metal oxides such as $MoO_3$, $V_6O_{13}$, $V_2O_5$, $MnO_2$, $LiCoO_2$ and $Cr_xO_y$ where $y/x$ is between 1.5 and 3. Other positive electrode materials that may be used are lithium polysulfide ($Li_2S_n$) and organic compounds such as polypyrrole, polythiophene, polyacetylene.

The following examples further illustrate the present invention.

EXAMPLE 1

A mixture of EC, PC, PAN and $LiClO_4$ in the initial amounts shown in Table 4 was heated in vacuum (<1 torr) at a temperature of about 120° C. After about 12 hours, an approximately 5 mil thick free-standing, film of the polymer electrolyte was obtained. The $EC/PC/PAN-LiClO_4$ electrolyte had the final composition shown in Table 4. This is electrolyte No. 1 in Table 1. Its conductivity was determined by the AC impedance method and was found to be $1.7 \times 10^{-3}$ ohm$^{-1}$.cm$^{-1}$ at 20° C. The conductivity of the electrolyte at other temperatures are shown in Table 1 and FIG. 1.

TABLE 4
TYPICAL COMPOSITION OF AN EC/PC/PAN-LiClO₄ POLYMER ELECTROLYTE

| | Initial Composition (g) | Final Composition (g) | Final Composition (mol %) |
| --- | --- | --- | --- |
| EC + PC | 4.8 (2.4 + 2.4) | 1.58 | 70 |
| PAN | 0.25 | 0.25 | 20 |
| LiClO₄ | 0.25 | 0.25 | 10 |

The IR spectrum of an $EC/PC/PAN-LiClO_4$ electrolyte film showed major absorption peaks due to C=O stretching frequency of the carbonates and C≡N of PAN, at 1750 and 2250 cm$^{-1}$, respectively. In comparison to neat EC or PC, the peak around 1750 cm$^{-1}$ appeared broad and slightly shifted towards lower wavenumber. This probably indicates coordination of the C=O in EC and PC with Li$^+$ as >C=O→Li$^+$.

X-ray diffraction studies showed the EC/PC/PAN-LiClO$_4$ electrolyte to be fully amorphous. The amorphous nature of the electrolyte was also confirmed by differential scanning calorimetric (DSC) results. The DSC trace of the electrolyte EC/PC/PAN-LiClO$_4$, between 20° and 150° C. showed no thermal transition peaks. This data indicates the polymer electrolyte is amorphous, and is stable up to 150° C.

The solid electrolyte of the final composition in Table 4 can also be prepared by heating a mixture of 0.79 g of EC, 0.79 g of PC, 0.25 g of PAN and 0.25 of LiClO$_4$ to about 120° C. and, without waiting for 12 hours, casting a film from this by pouring the solution onto a Teflon dish.

EXAMPLE 2

A solid electrolyte was prepared by heating a mixture of 3.2 g (0.036 mole) EC, 0.8 g (0.008 mole) PC, 0.65 g (0.012 mole) PAN and 0.33 g (0.003 mole) LiClO$_4$ to about 120° C. and casting a film. A film was cast by pressing the solution between two Teflon slides separated by a spacer of desired thickness and cooling the solution overnight to room temperature. The solid electrolyte had a conductivity at room temperature of $1.1 \times 10^{-3}$ ohm$^{-1}$.cm$^{-1}$.

EXAMPLE 3

A solid electrolyte film was cast from a mixture of 3.2 g (0.036 mole) of EC, 0.8 g (0.008 mole) PC, 0.065 g (0.012 mole) PAN and 0.61 g (0.003 mole) LiAsF$_6$ using a procedure similar to the one in Example 2. The solid electrolyte film had a conductivity at room temperature of $1.4 \times 10^{-3}$ ohm$^{-1}$.cm$^{-1}$.

EXAMPLE 4

An EC/PC/PAN-LiCF$_3$SO$_3$ solid polymer electrolyte of the final composition shown in Table 5 was prepared in the same manner as described in Example 1. The weights of the components are also presented in Table 5. An approximately 5 mil thick, free-standing electrolyte film thus prepared had a conductivity at 20° C. of $1.4 \times 10^{-3}$ ohm$^{-1}$.cm$^{-1}$. This is electrolyte No. 2 in Table 1. Its conductivity at other temperatures between $-10$ and 50° C. are listed in Table 1 and FIG. 1.

TABLE 5

TYPICAL COMPOSITIONS OF AN EC/PC/
PAN-LiCF$_3$SO$_3$ POLYMER ELECTROLYTE

|  | Initial Composition (g) | Final Composition (g) | Final Composition (mol %) |
|---|---|---|---|
| EC + PC | 7.2 (3.6 + 3.6) | 2.4 | 78 |
| PAN | 0.25 | 0.25 | 15 |
| LiCF$_3$SO$_3$ | 0.37 | 0.37 | 7 |

EXAMPLE 5

Polymer electrolyte No. 3 whose composition is presented in Table 1 was prepared by mixing 0.8 g PC, 3.2 g EC, 0.5 g PAN, 0.2 g TEGDA, 1 g LiClO$_4$ and 0.1 g of a photoinitiator (Darocur ™, EM Industries), and irradiating the resulting solution contained in a Teflon dish with UV-lamp (Black-Ray) ™ 100 watt, λ=365 nm) for about 10 minutes. The free-standing electrolyte film of about 5 mil thick thus obtained had a conductivity of $1.2 \times 10^{-3}$ ohm$^{-1}$.cm$^{-1}$ at 20° C. The conductivities of this electrolyte at other temperatures are presented in Table 1 and FIG. 2.

EXAMPLE 6

Solid polymer electrolyte No. 4 in Table 1 was prepared in the same manner as in Example 5 with 0.4 g PC, 1.6 g EC, 0.2 g TEGDA, 0.4 g LiClO$_4$ and 0.1 g of the photoinitiator. Its conductivities are presented in Table 1 and FIG. 2.

EXAMPLE 7

Solid polymer electrolyte No. 6 in Table 1 was prepared by photopolymerizing an electrolyte mixture of the composition shown in Table 6. The procedure was identical to that in Example 3. It exhibited a conductivity of $4 \times 10^{-4}$ ohm$^{-1}$.cm$^{-1}$ at 20° C.

TABLE 6

COMPOSITION OF AN EC/PC/VP-LiCF$_3$SO$_3$
ELECTROLYTE

|  | Composition (g) | Composition (mol %) | Conductivity ($\Omega^{-1}$cm$^{-1}$) at 20° C. |
|---|---|---|---|
| EC + PC | 3.5 (1.75 + 1.75) | 65 |  |
| VP* | 1.5 | 24 | $4.0 \times 10^4$ |
| LiCF$_3$SO$_3$ | 1.0 | 11 |  |

*VP is N-vinyl-2-pyrrolidinone.

EXAMPLE 8

Figure 3:
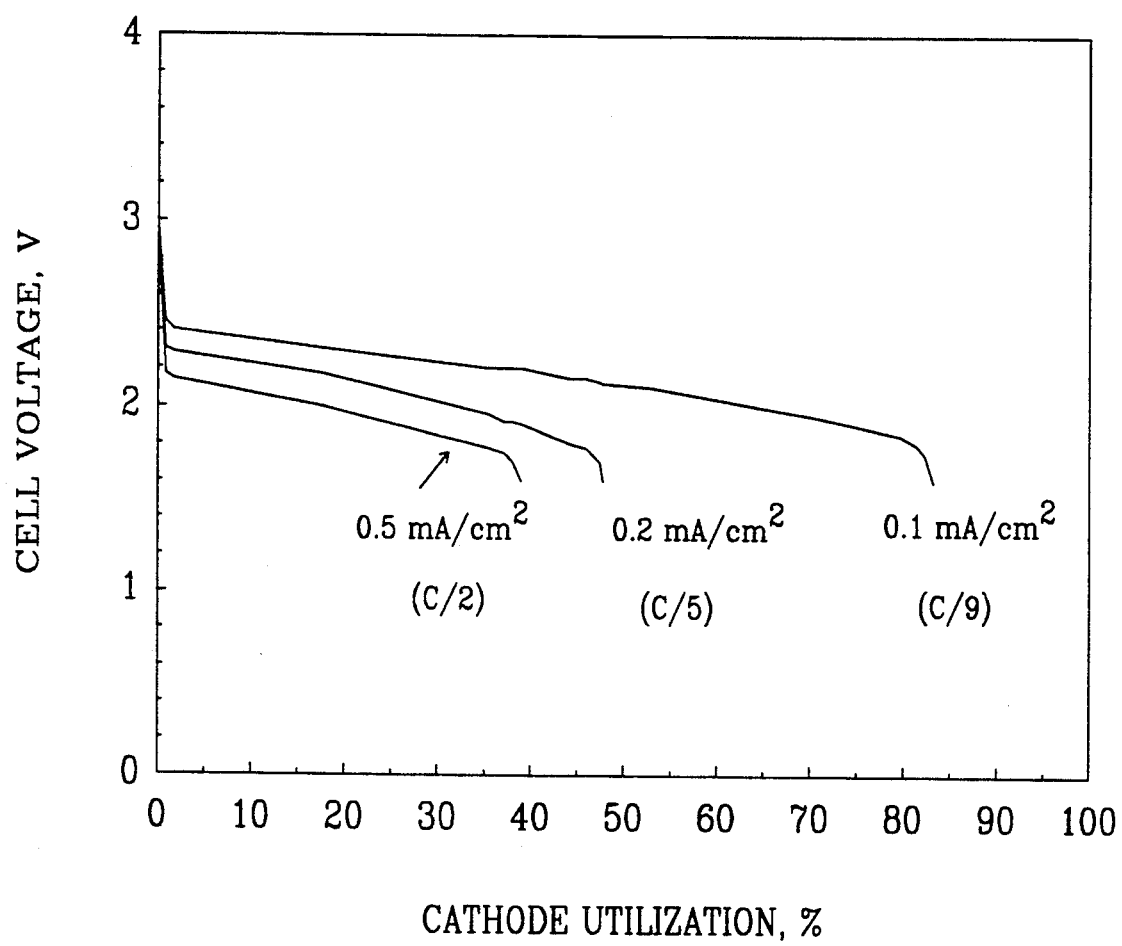
FIG. 3 depicts the room temperature discharge curves for a $Li/TiS_2$ solid-state cell utilizing a solid polymer electrolyte of this invention. Cathode capacity was 2.6 mAh. Electrolyte: $EC/PC/PAN/PEGDA/LiClO_4$.

A Li/TiS$_2$ rechargeable solid-state cell was as prepared by sandwiching electrolyte No. 1 in Table 1 (having a thickness of 5 mil) between a Li foil (5 mil thick) and a TiS$_2$ cathode (5 mil thick, prepared by passing a 50:50 weight percent mixture of electrolyte No. 1 in Table 1 and TiS$_2$ on a Ni foil) and holding the electrode package tightly between a spring-loaded cell holder. The cell was discharged and charged at 20° C. at current densities of 0.5, 0.2 and 0.1 mA/cm$^2$ corresponding to rates of C/2, C/5 and C/9, respectively. The cell exhibited discharge utilization of 39.9%, 49% and 85% of its theoretical capacity at the C/2, C/5 and C/9 rates, respectively, at room temperature. These results are graphically presented in FIG. 3.

The cell was repeatedly charged and discharged at 20° C. at current densities of 0.1 mA/cm$^2$ for discharge and 0.025 mA/cm$^2$ for charge. The discharge utilization at the 1st, 3rd, 5th and 10th cycles were 85%, 50%, 49% and 35% of the theoretical capacity, respectively.

EXAMPLE 9

An application of the polymer electrolyte of the present invention is in the fabrication of electrochromic devices for windows and displays. For these applications, the electrolyte should exhibit little light absorbance in the visible spectrum. To evaluate this, the UV-visible spectrum of electrolyte No. 4 in Table 4 was recorded in the wavelength region from 300 to 800 nm. The electrolyte showed no absorbance between 800 and 400 nm suggesting its usefulness in electrochromic devices.

What is claimed is:

1. Solid electrolytes with dimensional stability at room temperature composed of solutions of alkali metal salts in a plurality of miscible aprotic organic liquids, immobilized in an organic solid polymer matrix which itself can complex with said alkali metal salts wherein said liquids are ethylene carbonate and propylene carbonate and said polymer is selected from the group consisting of polyacrylonitrile and poly-N-vinyl-2-pyrrolidinone.

2. A solid electrolyte of claim 1 wherein said alkali metal salts are selected from the group of the low lattice energy lithium salts consisting of $LiBF_4$, $LiAsF_6$, $LiCF_3SO_3$, $LiClO_4$, and $LiPF_6$.

3. A solid electrolyte of claim 1 wherein said alkali metal salt is $LiClO_4$ and said polymer is polyacrylonitrile.

4. A solid-state, electric current producing rechargeable electrochemical cell comprising an alkali metal containing anode, a cathode, and a solid electrolyte of claim 1.

5. A cell of claim 4 wherein the anode is Li, Li alloy, or a Li-containing compound.

6. A cell of claim 5 wherein the alloy anode is selected from the group consisting of lithium-aluminum, lithium-tin, lithium-lead, lithium-gold, lithium-platinum, lithium-cadmium, lithium-mercury, lithium-zinc, lithium-silver, lithium-magnesium, lithium-gallium, lithium-indium, and lithium-thallium.

7. A cell of claim 5, wherein the Li-containing anode is a Li insertion compound of a transition metal oxide, a transition metal sulfide, or carbon such as $Li_xWO_2$, $Li_xTiS_2$, or $Li_xC$.

8. A cell of claim 4 wherein the cathode is selected from the group consisting of $TiS_2$, $MoS_2$, $V_6O_{13}$, and $MnO_2$.

* * * * *